United States Patent
Yamamoto et al.

(10) Patent No.: US 10,324,452 B2
(45) Date of Patent: Jun. 18, 2019

(54) ASSEMBLY WORKABILITY EVALUATION CALCULATION DEVICE AND ASSEMBLY WORKABILITY EVALUATION METHOD

(71) Applicant: Hitachi, Ltd., Chiyoda-ku, Tokyo (JP)

(72) Inventors: Noriaki Yamamoto, Tokyo (JP); Atsuko Enomoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1010 days.

(21) Appl. No.: 14/646,038

(22) PCT Filed: Oct. 31, 2013

(86) PCT No.: PCT/JP2013/079500
§ 371 (c)(1),
(2) Date: May 20, 2015

(87) PCT Pub. No.: WO2014/080733
PCT Pub. Date: May 30, 2014

(65) Prior Publication Data
US 2015/0293525 A1 Oct. 15, 2015

(30) Foreign Application Priority Data
Nov. 21, 2012 (JP) ................................ 2012-255303

(51) Int. Cl.
*G06F 17/50* (2006.01)
*G06T 19/20* (2011.01)
(Continued)

(52) U.S. Cl.
CPC ... *G05B 19/4097* (2013.01); *G05B 19/41805* (2013.01); *G06F 17/50* (2013.01);
(Continued)

(58) Field of Classification Search
CPC .......... G05B 19/4097; G05B 19/41805; G06F 17/5009
(Continued)

(56) References Cited

U.S. PATENT DOCUMENTS 5,717,598 A * 2/1998 Miyakawa ......... G05B 19/4097
700/103
7,533,001 B2 * 5/2009 Demizu .............. G06F 17/5009
702/182

FOREIGN PATENT DOCUMENTS

JP 05-114003 A 5/1993
JP 3391648 B2 3/2003
(Continued)

OTHER PUBLICATIONS

P. Gu et al., "CAD-directed automatic assemby sequence planning"; Int. J. Prod. Res. 1995, vol. 33, No. 11, 3069-3100.*

*Primary Examiner* — Regis J Betsch
*Assistant Examiner* — Kaleria Knox
(74) *Attorney, Agent, or Firm* — Miles & Stockbridge P.C.

(57) ABSTRACT

An apparatus is configured including an information obtaining unit that extracts information on plural parts' attributes, locations, and adjoining relations with other parts; a unit that sorts parts by part type and detects a distinctive shape from 3D CAD model; a unit that represents adjoining relations between parts in an assembly graph; a unit that creates disassembling directions and a disassembling sequence based on the assembly graph and, by reversing them, derives an assembling sequence and assembling directions; a unit that computes an index indicating a quality of easiness of assembling a part by subtracting the sum of deficiency points per part from a reference score; a unit that creates virtual worker positions, postures, and viewpoints according to assembling sequence and evaluates workability; and a
(Continued)

unit that computes an evaluation value per part by the index of easiness of assembling the part and a total evaluation value of assembly workability.

8 Claims, 14 Drawing Sheets

(51) Int. Cl.
*G05B 19/418* (2006.01)
*G05B 19/4097* (2006.01)

(52) U.S. Cl.
CPC .......... *G06F 17/5086* (2013.01); *G06T 19/20* (2013.01); *G05B 2219/31052* (2013.01); *G05B 2219/32104* (2013.01); *G05B 2219/35197* (2013.01); *G06F 2217/02* (2013.01); *G06F 2217/06* (2013.01); *G06T 2219/2008* (2013.01); *Y02P 90/04* (2015.11); *Y02P 90/22* (2015.11); *Y02P 90/265* (2015.11)

(58) Field of Classification Search
USPC ............................................ 702/182; 700/63
See application file for complete search history.

(56) References Cited

FOREIGN PATENT DOCUMENTS

| | | | |
|---|---|---|---|
| JP | 4136673 B2 | 8/2008 | |
| JP | 2012-014569 A | 1/2012 | |
| WO | WO2012101895 * | 8/2012 | ............. G06F 17/50 |

* cited by examiner

| No. | SORT | ITEM | DATA |
|---|---|---|---|
| 1 | PART ATTRIBUTE | PART ID | 5 |
| 2 | | HIERARCHY NO. | 2 |
| 3 | | MODEL NAME | A_FRAME |
| 4 | | PART DRAWING NO. | A12345 |
| 5 | | PART TITLE | A |
| 6 | | MATERIAL | SPCC |
| 8 | DISTINCTIVE SHAPE | CUBIC VOLUME | 10000 |
| 9 | | SURFACE AREA | 9600 |
| 10 | | MAX. LENGTH | 160 |
| 11 | | GRAVITY CENTER | 10, 5, 30 |
| 12 | | BOUNDING BOX | 5 |
| 13 | | . . . . | . . . |
| 14 | PART LOCATION | X AXIS OF PART | 1, 0, 0 |
| 15 | | Y AXIS OF PART | 0, 1, 0 |
| 16 | | Z AXIS OF PART | 0, 0, 1 |
| 17 | | ORIGIN OF PART | 0, 5, 0 |
| 18 | PARTS ORGANIZATION | PARENT PART ID | 4 |
| 19 | | CHILD PART ID | 5 |
| 20 | ADJOINING RELATIONS BETWEEN PARTS | RESTRAINING ELEMENT TYPE | COPLANAR |
| 21 | | PART ID INCLUDING RESTRAINING ELEMENT | 5 |
| 22 | | PART ID RESTRAINED | 7 |
| 23 | | NORMAL OF RESTRAINT PLANE | 0, 0, 1 |
| 24 | | ORIGIN OF RESTRAINT PLANE | 0, 0, 0 |
| 25 | POSITIONING MARK | CONNECTOR FEATURE TYPE | PONCH |
| 26 | | PART ID INCLUDING CONNECTOR FEATURE | 8 |
| 27 | | PART ID CONNECTED | 10 |

| PART TYPE ID | PART TYPE NAME | CONDITIONS TO DETERMINE PART ATTRIBUTE OF 3D CAD MODEL | | | |
|---|---|---|---|---|---|
| | | MODEL NAME | PART DRAWING NO. | TITLE OF PART NAME | DIMENSION CONDITION |
| 1 | SCREW | *Screw* | 1234* | | |
| 2 | SCREW | | | SCREW* | |
| 3 | COUNTERSUNK SCREW | SC* | 5522* | COUNTERSUNK SCREW | |
| 4 | STOP RING | Etomewa* | | E STOP RING | |
| 5 | STOP RING | Ctomewa* | 2224* | C STOP RING | |
| 6 | O RING, SMALL | | O* | *RING* | MAX. DIMENSION IS EQUAL TO OR LESS THAN 100 |
| 7 | O RING, LARGE | | O* | *RING* | MAX. DIMENSION IS MORE THAN 100 |
| 8 | RIVET | | | RIVET | |
| .... | .... | .... | | | |

FIG.5

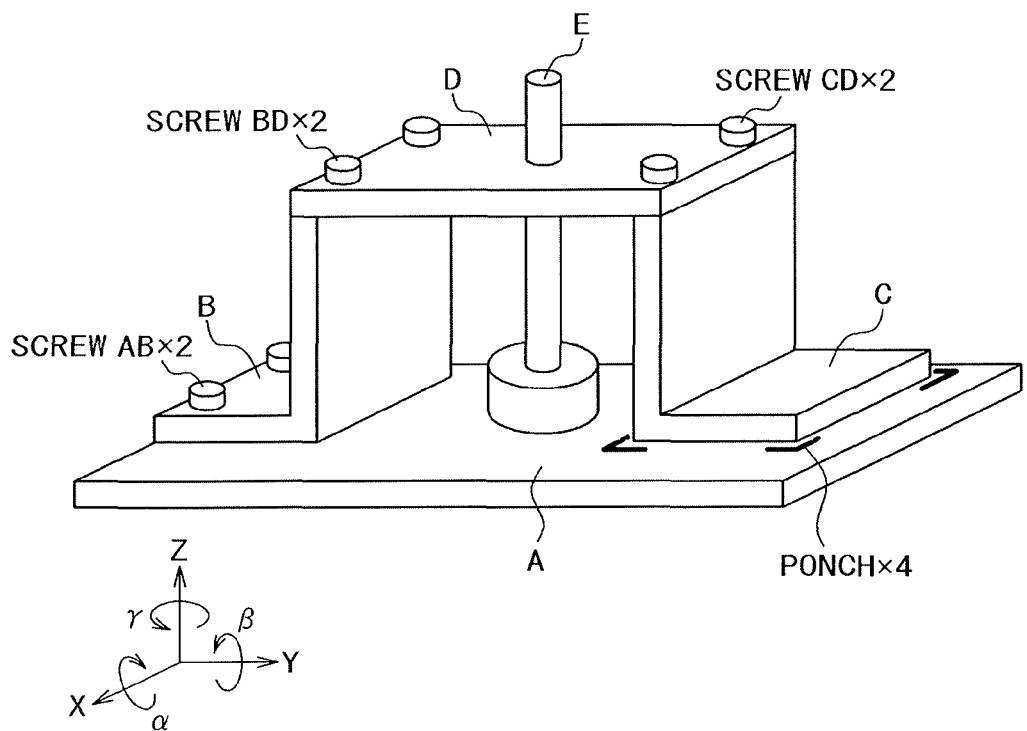

FIG. 9A (NOTE) $\varepsilon x = f_1(Cx) = f_{11}(Tx) = f_{21}(Ix)$

135

| BASIC ELEMENT (X) | | | BASIC DEFICIENCY POINT ($\varepsilon x$) (NOTE) | ASSEMBLING COST ($Cx$) (YEN) | ASSEMBLING TIME ($Tx$) (MIN.) | ASSEMBLING COST INDEX ($Ix$) |
|---|---|---|---|---|---|---|
| NAME | SYMBOL (X) | ACTION | | | | |
| MOVE DOWN & FIT | ↓ | 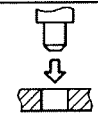 | 0 | 1.0 | 0.020 | 100 |
| MOVE LATERALLY & FIT | → |  | 5 | 1.3 | 0.025 | 128 |
| SCREW TIGHTENING | S | 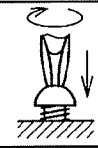 | 7 | 1.5 | 0.040 | 146 |
| WELDING | W | 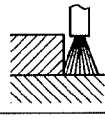 | 12 | 2.8 | 0.350 | 185 |
| PRESS-FIT | C | | | | | |
| | | | | | | |

FIG. 9B (NOTE) VALUE: $\alpha n = \left( \dfrac{C_x X_n}{C_x} \right) X_{mean}$

135

| COMPENSATORY ELEMENT (x) | | | | COMPENSATORY COEFFICIENT ($\alpha$) | | ASSEMBLING COST ($C_x$ xn) | |
|---|---|---|---|---|---|---|---|
| NAME | SYMBOL (x) | DIVISION | | VALUE (NOTE) | SYMBOL ($\alpha$) | X= ↓ | X= → |
| | | n | SYMBOL (xn) | DETAIL | | | |
| SIZE | $\ell$ | | | MAX. DIMENSION, MASS, ACTION DURATION, ETC. | | $\lambda$ | |
| SHAPE/ POSTURE ACCURACY | p | | | SHAPE, ACTION ACCURACY, ETC. | | $\theta$ | |

F I G . 1 1
(a)
ASSEMBLED PART IS HARD TO
VIEW BECAUSE OF OBSTRUCTION
A/B=0. 7
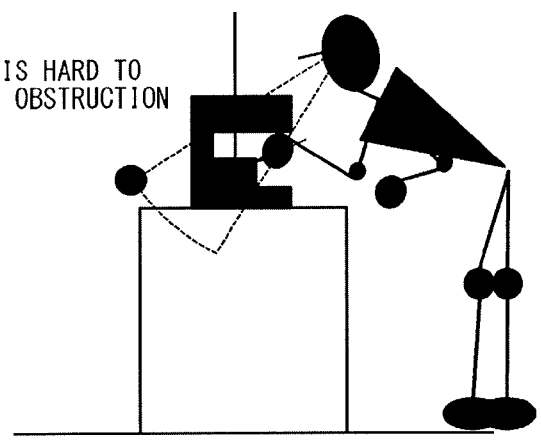
(c)
NOT VISIBLE
A/B=0
(b)
ASSEMBLED PART
IS EASY TO VIEW
WITHOUT OBSTRUCTION
A/B=1
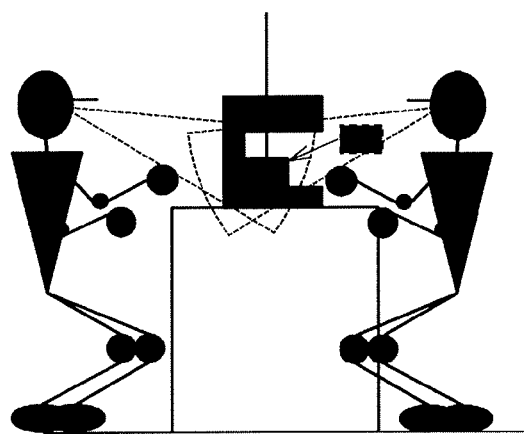

138

| ASSEMBLING DIRECTION | WORKING POSTURE | EYE LINE | SCORE |
|---|---|---|---|
| DOWNWARD | STANDING POS. | OBLIQUELY DOWN | 1 |
| DOWNWARD | HALF-CROUCHING | LATERAL | 0.5 |
| OBLIQUELY UPWARD | STANDING POS. | OBLIQUELY UP | 0.7 |
| . . . | . . . | . . . | . . . |

ASSEMBLY WORKABILITY EVALUATION CALCULATION DEVICE AND ASSEMBLY WORKABILITY EVALUATION METHOD

BACKGROUND

The present invention relates to an assembling workability evaluation computing apparatus and an assembling workability evaluation method.

Background art in a technical field relevant to the present invention is found in Japanese Patent Publication No. 3391648. This publication describes "a technique for improving operability with an equipment operability evaluating apparatus using human body models, which predefines the reference position of a human body model which is placed in a simulation space depending on a basic posture of the human body model and, upon change of the human body model to a model of a human body having a different shape, places the human body model after the change in the simulation space so that the model's basic position remains the same before and after the change".

Background art is also found in Japanese Patent Publication No. 4136673. This publication describes "a technique for examining the safety of an equipment utilizing equipment models and worker models and using a vision image viewed from the viewpoint of a worker model in a virtual three-dimensional space and an implementation thereof with an equipment placing unit that places an equipment model subjected to examination in the virtual three-dimensional space, a view angle assigning unit that allows an operator to assign a view angle of a worker model, an opening position assigning unit that allows the operator to assign the position of an opening of an equipment model, a viewpoint position assigning unit that allows the operator to assign the position of a viewpoint of a worker model, a worker placing unit that places the worker model in the virtual three-dimensional space according to the opening position or the viewpoint position, and a vision image display unit that determines the boundaries of a vision image when viewed from the viewpoint of the worker model, using the view angle, on the assumption that the direction of the line of sight of the worker model is downward in a vertical direction, and displays a vision image within the boundaries."

Japanese Unexamined Patent Application Publication No. 2012-14569 describes "an assembling sequence creating system that creates an assembling sequence for sequentially assembling a plurality of parts constituting an assembly, configured with a parts' locations and proximity relations obtaining unit that obtains, from CAD, information on the locations of a plurality of parts and proximity relations with other parts, an assembling units setup unit that sets up assembling units to assemble a plurality of parts, an assembling sequence creating unit that creates a sequence to assemble a plurality of parts to prevent a part from interfering with a neighboring part from the parts' locations and proximity relations obtained by the parts' locations and proximity relations obtaining unit and the assembling units set up by the assembling unit setup unit, and an assembling animation creating unit that creates actions of assembling a plurality of parts and a camera's viewpoint to observe the assembling actions from an assembling sequence created by the assembling sequence creating unit."

Japanese Unexamined Patent Application Publication No. Hei 5-114003 discloses "a method and system for automatically evaluating manufacturability, which quantitatively evaluate whether or not a designed structure of a product is easy to manufacture, particularly, whether or not parts are easy to assemble into the structure, based on design information created with CAD or the like, in order to improve productivity of products." The above publication also describes "a configuration thereof comprised of a computer system that evaluates easiness of manufacturing such as assemblability and processability and proposes an improvement example, a processing routine that presumes an assembling sequence, a processing routine that determines an optimal assembling sequence, assembling method, processing method, etc. from results of computing an assembling method, processing method, etc., a processing routine that proposes an improvement example, a routing that outputs a result, and an improvement example database in which a result of evaluation and design information are automatically stored."

SUMMARY

In Japanese Patent Publication Nos. 3391648 and 4136673, it is required to place a human body model (worker model) relative to an equipment model subjected to examination in a virtual space, move that model, and examine workability. A problem of the present invention is to provide an assembling workability evaluation computing apparatus and an assembling workability evaluation method which deduce the position and posture of a worker from a parts assembling procedure and actions based on information relevant to a product model subjected to examination and automatically compute assemblability evaluation of a product in a design phase in terms of ergonomics evaluations of visibility, working posture, reachability, etc. during assembling work without requiring an evaluator to place and move a human body model.

To solve the above problem, in the present invention, an assembling workability evaluation computing apparatus that evaluates assemblability and workability of assembling work which sequentially assembles a plurality of parts constituting an assembly is configured including an information obtaining unit that extracts information on attributes of each of a plurality of parts, locations of the parts, and adjoining relations with other parts from a 3D CAD model obtained from CAD; a parts sorting and distinctive shape detecting unit that sorts parts by part type from obtained 3D CAD model information; a unit that represents relations between parts in an assembly graph in which nodes denote parts and edges denote adjoining relations from information relevant to adjoining relations between parts in 3D CAD model information; a unit that creates disassemblable directions, based on the assembly graph, creates disassembling directions and a disassembling sequence, and, by reversing the disassembling sequence and directions, derives an assembling sequence and assembling directions; a unit that computes deficiency points of a part by multiplying a basic deficiency point Ex for each part assembling action by a compensatory coefficient α and computes an index indicating a quality of easiness of assembling a part into an assembly by subtracting the sum of deficiency points per part from a reference score (a perfect score of 100); a unit that creates a plurality of virtual worker positions, postures, and viewpoints according to an assembling sequence; a unit that evaluates workability in the created worker positions, postures, and viewpoints; and an overall evaluation unit that computes an evaluation value per part by the index of easiness of assembling the part and a total evaluation value of assembly workability and outputs results.

To solve the above problem, in the present invention, an assembling workability evaluation method for evaluating assemblability and workability of assembling work which sequentially assembles a plurality of parts constituting an assembly includes the following steps: extracting information on attributes of each of a plurality of parts, locations of the parts, and adjoining relations with other parts from a 3D CAD model obtained from CAD; sorting parts by part type and detecting a distinctive shape from obtained 3D CAD model information; representing relations between parts in an assembly graph in which nodes denote parts and edges denote adjoining relations from information relevant to adjoining relations between parts in 3D CAD model information; creating disassemblable directions, based on the assembly graph, creating disassembling directions and a disassembling sequence, and deriving an assembling sequence and assembling directions by reversing the disassembling sequence and directions; computing deficiency points of a part by multiplying a basic deficiency point Ex for each part assembling action by a compensatory coefficient α and computing an index indicating a quality of easiness of assembling a part into an assembly by subtracting the sum of deficiency points per part from a reference score (a perfect score of 100); creating a plurality of virtual worker positions, postures, and viewpoints according to an assembling sequence; evaluating workability in the created worker positions, postures, and viewpoints; and an overall evaluation step that computes an evaluation value per part by the index of easiness of assembling a part and a total evaluation value of assembly workability and outputs results.

According to the present invention, using information on a model subjected to examination, an automatic evaluation is made of a worker position, posture, and eye line in relation to assembling motions. Thus, an automatic evaluation becomes possible from a plurality of perspectives of easiness of assembling a part into an assembly, a degree of fatigue of a worker, and easiness of moving of a worker and advantageous effects of shortening time for examination to make an assemblability evaluation in a design phase and reducing products that are returned to design are provided.

Problems, configurations, and advantageous effects which are other than noted above will be clarified from the following description of an embodiment.

BRIEF DESCRIPTION OF THE DRAWINGS

FIG. 3 is an example of a table of 3D CAD model information stored in a storage part of the assembling workability evaluation computing apparatus;

FIG. 4 is an example of a table of part type information stored in the storage part of the assembling workability evaluation computing apparatus;

FIG. 5 is an example of a 3D CAD model;

FIG. 9A is a diagram presenting an example of a data table of basic elements X for use in an assemblability evaluation method; FIG. 9B is a diagram presenting an example of a data table of compensatory elements $\chi$ and a compensatory coefficient α for use in the assemblability evaluation method;

FIG. 11 is a diagram to explain visibility evaluation processing;

DETAILED DESCRIPTION

In the following, the present invention will be described by way of its embodiments and with the aid of the drawings.
First Embodiment In a first embodiment, an assembling workability evaluation computing apparatus 100 is described which, from 3D CAD data of a product designed through a 3D CAD device 200, creates an assembly graph representing distinctive features of respective parts and adjoining relations between the parts, creates an assembling sequence, assembling directions, and actions, and performs an evaluation of parts assembling actions according to the assembling procedure and ergonomics evaluations.

Figure 1:
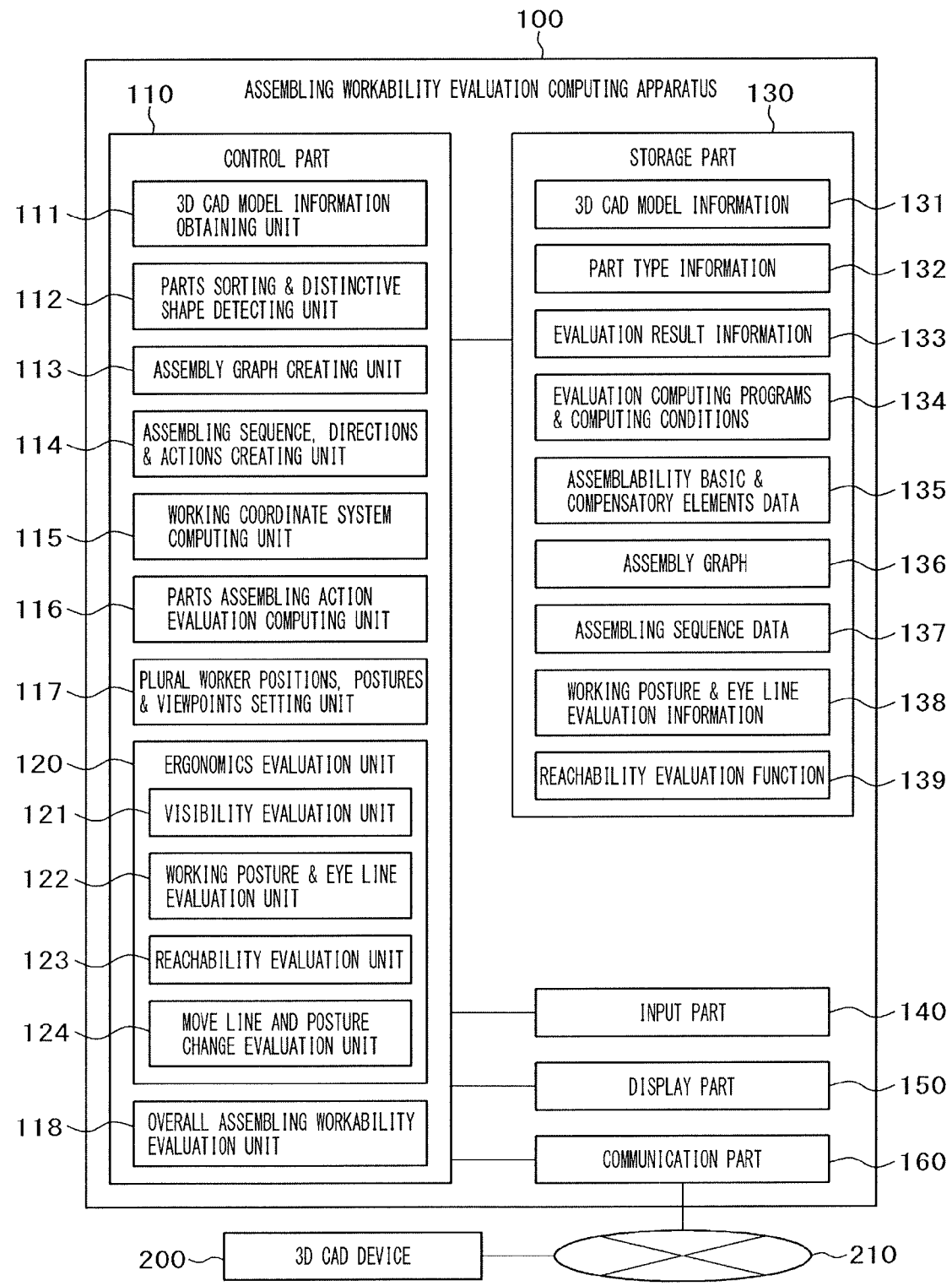
FIG. 1 is an example of a rough overall structure diagram of an assembling workability evaluation computing apparatus of the present invention.

FIG. 1 depicts an example of a rough overall structure diagram of the assembling workability evaluation computing apparatus 100 as an assemblability evaluation system which is applied in the first embodiment of the present invention. This assembling workability evaluation computing apparatus 100 is comprised of an input part 140 including, inter alia, a keyboard and a mouse, through which setup information required for analysis is input and a user request selected from a menu or any other user request or the like is input; a display part 150 which displays a model subjected to evaluation, input information, a result of processing, progress of an operation in process, etc.; a control part 110 which obtains adjoining relations from 3D CAD data, creates an assembling sequence, directions, and actions, and executes an evaluation of parts assembling actions, ergonomics evaluations, evaluation result output processing, etc.; a storage part 130 which stores 3D CAD data, an analysis program, computing conditions, computing results, etc.; and a communication part 160 which receives 3D CAD data from the 3D CAD device 200 which is provided externally via a network 210.

Here, the control part 110 includes a CPU (Central Processing Part), ROM (Read Only Memory), and RAM (Random Access Memory) and the storage part 130 is configured with an external storage device such as a hard disk device. As the input part 140, a touch panel, switches and sensors for exclusive use, or a voice recognizer may be used. As the display part 150, a device that displays information on a screen is used, such as a display, projector, and head-mounted display. A printer (not depicted) that outputs information displayed on the display part 150 onto paper may be connected to the assembling workability evaluation computing apparatus 100.

It does not take a dedicated device to provide the above hardware structure and a general computer system such as a personal computer can be used.

The control part 110 of the assembling workability evaluation computing apparatus 100 includes a 3D CAD model information obtaining unit 111, a parts sorting and distinctive shape detecting unit 112, an assembly graph creating unit 113, an assembling sequence, directions, and actions creating unit 114, a working coordinate system computing unit 115, a parts assembling action evaluation computing unit 116, a plural worker positions, postures, and viewpoints setting unit 117, an ergonomics evaluation unit 120, and an overall assembling workability evaluation unit 118. In the ergonomics evaluation unit 120 which evaluates easiness to do work and a degree of fatigue of a worker, the following are included: a visibility evaluation unit 121, a working posture and eye line evaluation unit 122, a reachability evaluation unit 123, and a move line and posture change evaluation unit 124.

The storage part 130 of the assembling workability evaluation computing apparatus 100 is provided with the following storage areas for: 3D CAD model information (models of assemblies which may be subjected to evaluation) obtained from the 3D CAD device and 3D CAD model information 131 in table form extracted from the above information; part type information 132 which is referred to for parts sorting and distinctive shape detecting processing; evaluation result information 133, the area of which stores a result of computing an evaluation of parts assembling actions (parts assemblability score Ei) and an overall assembling workability evaluation; evaluation computing programs and computing conditions 134, the area of which stores evaluation computing programs to be run by each unit and computing conditions; assemblability basic and compensatory elements data 135, the area of which stores a data table of basic elements X and a data table of compensatory elements χ and a compensatory coefficient α for use in an assemblability evaluation method; assembly graph 136, the area of which stores an assembly graph created from adjoining relations between parts from a 3D CAD model; assembling sequence data 137, the area of which stores assembling sequence data created by the assembling sequence, directions, and actions creating unit; working posture and eye line evaluation information 138, the area of which stores in table form the scores given to possible combinations of data values assigned to the data items of part assembling direction, working posture, eye line, and score; and reachability evaluation function 139 which defines an evaluation function to be referred to in a reachability evaluation process.

Figure 2:
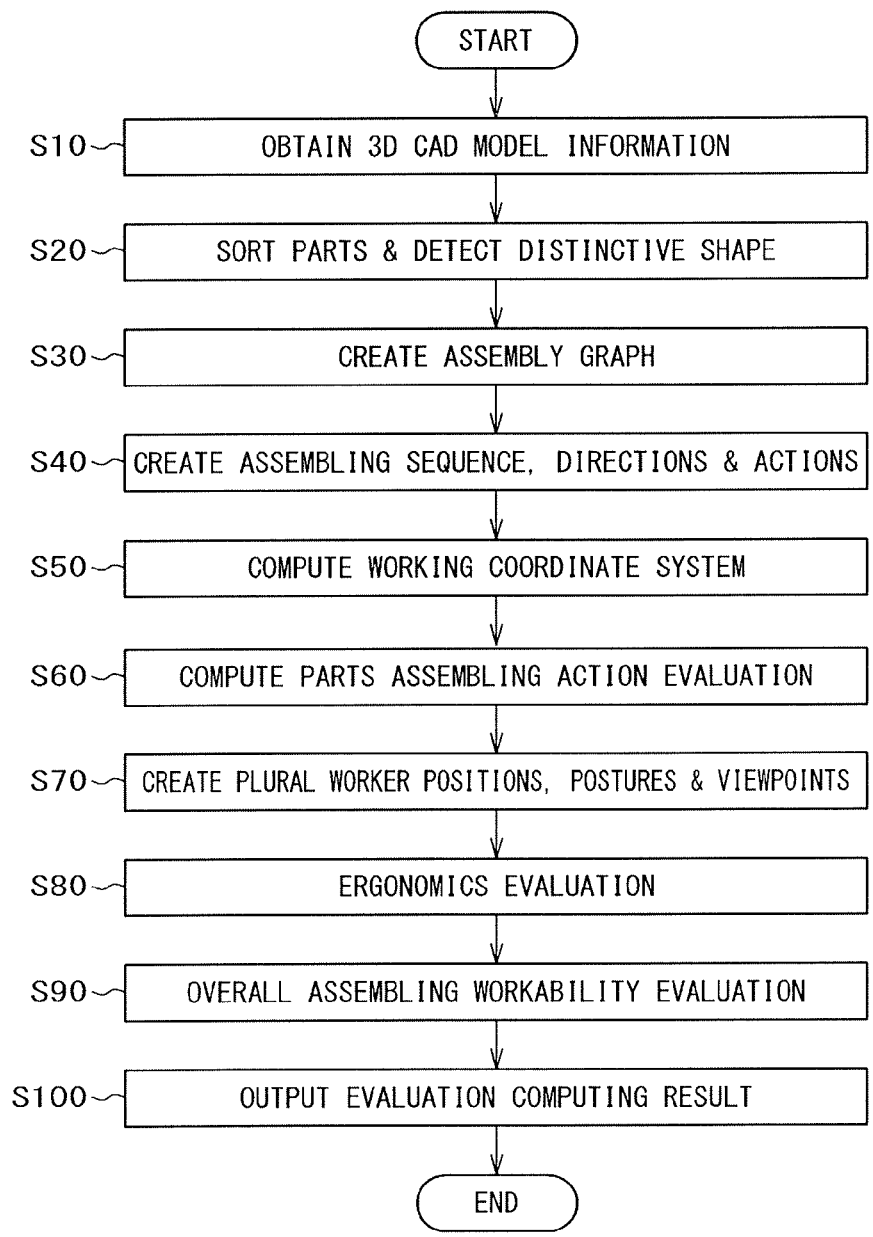
FIG. 2 is an example of a flowchart describing a procedure in which, from 3D CAD data obtained, the apparatus performs processing operations, eventually outputting a result of overall assembling workability evaluation, according to an embodiment of the present invention.

FIG. 2 is an example of a flowchart describing a procedure in which, from 3D CAD data obtained from the 3D CAD device 200, the assembling workability evaluation computing apparatus 100 performs processing operations, eventually outputting a result of overall assembling workability evaluation.

In FIG. 2, at step S10 of obtaining 3D CAD model information; the apparatus 100 reads in 3D CAD model information (for a model of an assembly subjected to evaluation) obtained from the 3D CAD device 200 and stored in the storage part 130, obtains information on organization of parts of an assembly, the locations of the parts, model name and dimensions, part attributes such as the central position and barycentric position of a part, and adjoining relations between parts, creates 3D CAD model information 131 in table form which is presented in FIG. 3, and stores this information into the storage part 130. Here, what is subjected to evaluation is an assembly model which is an assembly comprised of a plurality of parts.

In a "sort" column of a table in FIG. 3, "part attribute" data and "distinctive shape" data which are extracted are as follows: part ID, class number, hierarchy number, model name, part drawing number, part title, the cubic volume, surface area, material, specific gravity, mass, maximum length, and gravity center of a part, bounding box (the coordinates of eight vertices of a rectangular solid defining the bounds enclosing parts), principal moment of inertia, principal axis of inertia, etc.

Data "part location" is the position and posture of each part in an assembly model placed in a world coordinate system and is comprised of three axes of X, Y, and Z and the origin of a part in a part coordinate system of each part.

Data "parts organization" is information indicating a parent-child relationship between a sub-assembly and a part in a 3D CAD model and its data items are as follows: parent part ID, child part ID, a flag denoting a sub-assembly, and a flag denoting no relevance (information representing non-display or suppression in a 3D CAD model).

Data "adjoining relations between parts" is assembly restraining information which is set when modeling an assembly model and is comprised of restraining element type, part ID including a restraining element, part ID restrained, and a normal and origin of a restraint plane which represent the restraint plane. Assembly restraining information is not only set by a designer in a modeling phase and may also be obtained by analysis of clearances between parts based on an assembly model. Here, one manner of clearance analysis is to search for another model existing within a clearance distance from all sides of a modeled part, based on a set threshold value, and create information representing the position and posture of a plane (planar, cylindrical, conical, etc.) of an adjoining part found by the searching.

If a restraint plane obtained from assembly restraining and clearance analysis information is a planar plane, the apparatus 100 obtains a normal vector of the restraint plane which defines an outer surface of the model and a point on the plane as an origin of the restraint plane. If the restraint plane is a cylindrical plane, the apparatus 100 takes the cylindrical axial direction as a normal vector of the restraint plane and a point on the axis as an origin of the restraint plane.

In the present flowchart, a modeling operation to create 3D CAD models and an operation of specifying a model subjected to analysis are omitted.

In FIG. 2, at step S20 of sorting parts and detecting a distinctive shape; the apparatus 100 reads in part type information 132 from the storage part 130 and determines the part types of all component parts stored in the 3D CAD model information 131 obtained at step S10 according to conditions of a specified model name (such as a string of leading characters specified) and specified dimensions of the parts (e.g., less than or equal to the specified dimensions).

FIG. 4 is an example of part type information 132 stored in the storage part 130 and this information is used in making a determination at the step S20. As information for extracting a part type, a part type table 132 has items of conditions to identify a part type by part attribute (model name, part drawing No., and part title) in 3D CAD and distinctive shape in 3D CAD and is configured such that a part type name matched with extraction conditions in each row is identified by part type ID. In an example of FIG. 4, the apparatus 100 searches through the items of extraction conditions in each row except for blank cells. Here, the part drawing No. and part title are text information optionally defined by user and assigned to a part model or assembly model in 3D CAD. As for part attribute represented in a character string, such as model name and part title in 3D CAD, a part type may be extracted by not only completely matching with all characters in a character string, but also partially matching with them. Thus, in the table cells, a character string including a wild card character (such as an asterisk) denoting an arbitrary set of characters is stored. Columns of character string conditions may be added and conditions such as complete match, left-hand match, and right-hand match may be defined. As for distinctive shape, in addition to dimension condition in this example, distinctive mass may be stored which can be obtained by computing 3D CAD models in terms of the vertices of a bonding box, gravity center, principal moment of inertia among others on a part model level. In determining a part type by numerical value, conditions such as "equal", "less than", and "more than", which represent a range, are used and AND and OR conditions of these conditions can be set.

In FIG. 2, at step S30 of creating an assembly graph; the apparatus 100 creates data representing relations between parts in the form of a graph in which nodes denote parts and edges denote adjoining relations from information relevant to adjoining relations between parts in the 3D CAD model information obtained at step S10.

FIG. 5 is an example of a 3D CAD model in which parts B and C lie on a part A, a part B is fastened onto the part A with two screws AB, a part C is positioned with PONCH shapes (positioning marks) and welded to the part A. A part D is fastened to the part B with two screws BD and to the part C with two screws CD. A part E is inserted in a hole of the part A through a hole of the part D. A coordinate system shown at the bottom left under the model denotes a world coordinate system. Based on this model, further descriptions are provided below.

Figure 6:
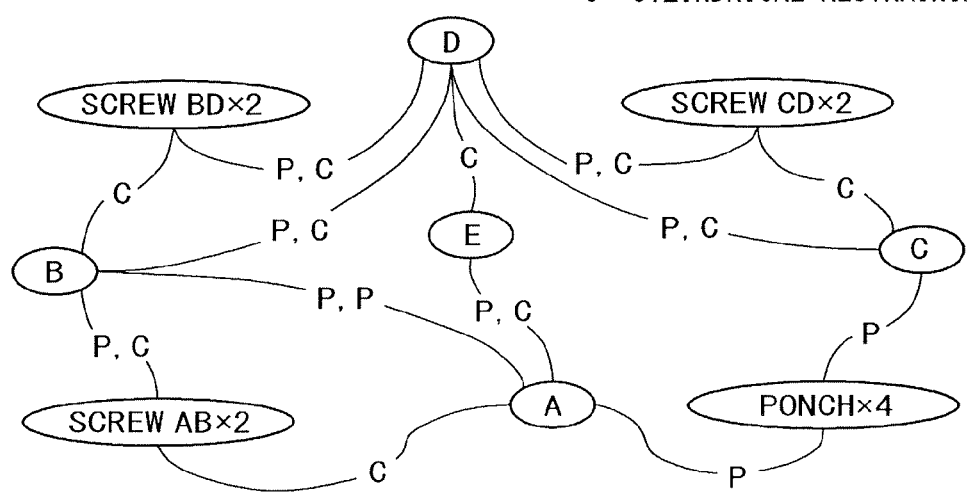
FIG. 6 is an example of an assembly graph created from adjoining relations between parts that constitute the 3D CAD model depicted in FIG. 5.

FIG. 6 is an example of an assembly graph created from adjoining relations between parts that constitute the 3D CAD model depicted in FIG. 5. This is a graph representation with nodes that denote parts and edges that denote adjoining relations between parts. These edges represent different adjoining relations (different adjoining directions and different adjoining planes). A rough separation is made between planar restraining (coplanar) and cylindrical restraining (coaxial); planar restraining is denoted by P and cylindrical restraining is denoted by C on the edges in FIG. 6. In FIG. 6, plural pieces of parts whose model name is identical and having the same assembling direction and the same adjoining relation (the same adjoining direction and adjoining plane) are represented as one node (such as screws AB, BD, and CD). The created assembly graph is stored into the storage part 130.

In FIG. 2, at step S40 of creating assembling sequence, directions, and actions; according to, for example, an assembling sequence creation method which is disclosed in Japanese Unexamined Patent Application Publication No. 2012-14569, the apparatus 100 creates disassemblable directions, based on the assembly graph 136 created at step S30, creates disassembling directions and a disassembling sequence, and, by reversing the disassembling sequence and directions, derives an assembling sequence and assembling directions.

Figure 7:
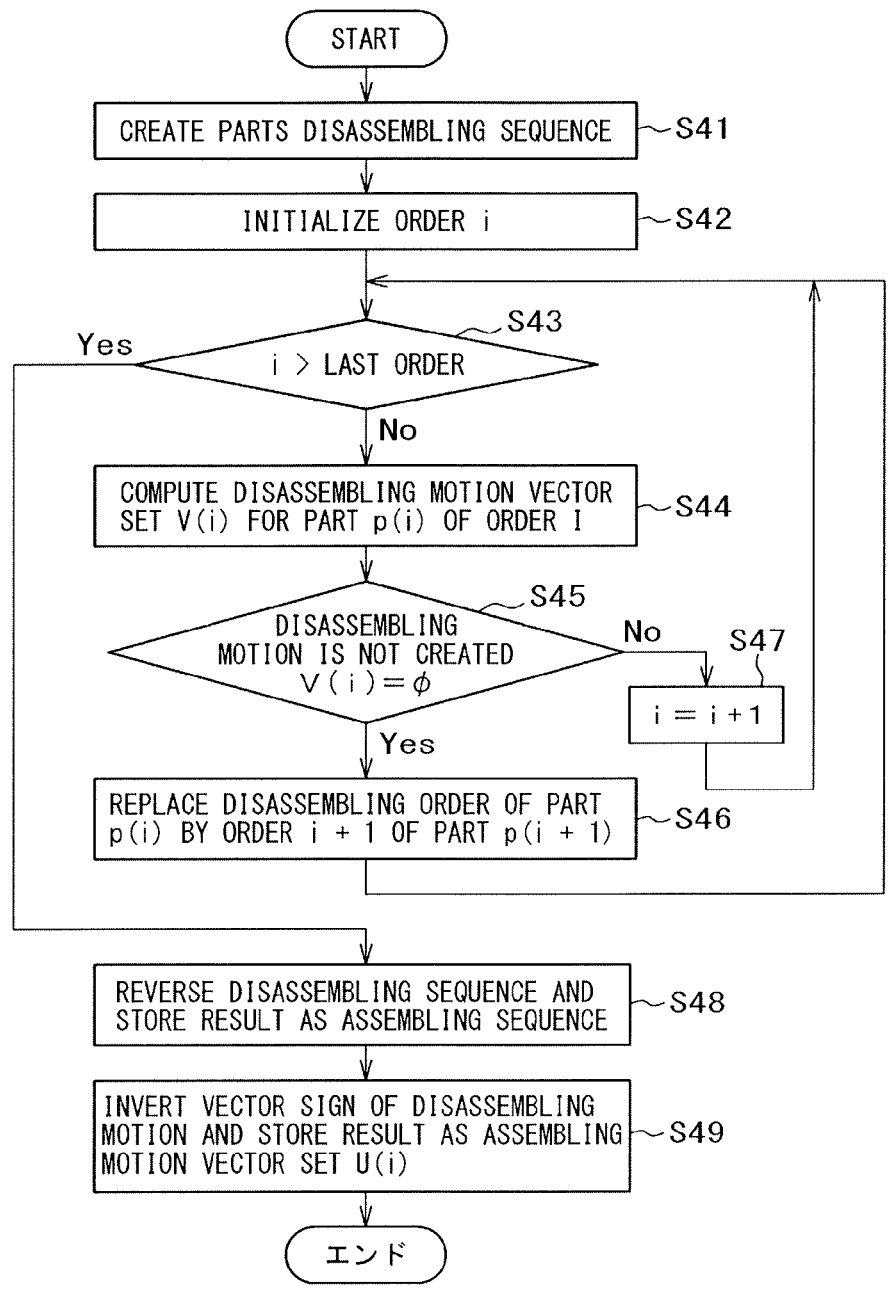
FIG. 7 is an example of a flowchart to explain processing, eventually creating data of an assembling sequence and directions from a 3D CAD assembly model.

FIG. 7 is an example of a flowchart to explain processing, eventually creating an assembling sequence and directions. The apparatus 100 first creates a disassembling sequence and disassembling directions from an assembly model of 3D CAD and creates an assembling sequence and assembling directions by inverting a disassembling motion vector sign.

In FIG. 7, at step S41; from the eight vertices of a minimum rectangular solid that encloses parts of interest specified by the data of locations of parts and adjoining relations between parts in the 3D CAD model information 131 which is stored in the storage part 130, the apparatus 100 makes six constituent planes of the minimum rectangular solid and creates parts disassembling sequence plans as follows:

(1) Order the component parts in order of height in a vertical direction to which any of the six constituent planes of the minimum rectangular solid is set.

(2) As for a group of parts for which four constituent planes of the minimum rectangular solid are parallel to a direction axis specified by user, in a group of parts satisfying an inclusion relation between parts with respect to the four constituent planes, order the parts in order from innermost outward or outermost inward.

Here, in the way of (2), two parts which do not have an inclusion/exclusion relation with each other cannot be ordered. In such a case, by ordering the parts in the way of (1), it is possible order all parts. While the way of (1) solely makes it possible to order all parts; as for parts of the same order, it is also possible to add a condition such as giving higher order to a part for which any of the six constituent planes of the minimum rectangular solid is at its left side.

In FIG. 7, at step S42, the apparatus 100 initializes order i in the disassembling sequence created at step S41. At step S43, the apparatus 100 determines whether or not order i has reached the last order in the disassembling sequence. If not so (No); at step S44, the apparatus 100 computes a disassembling motion vector set v(i) for a part p(i) of interest whose disassembling order is i, according to a method which will be described later. At step S45, the apparatus 100 determines whether or not a disassembling motion has been created. If a disassembling motion is not created because of interference with another part abutting the part (Yes); at step S46, the apparatus 100 increments the order of the part p(i) of interest to i+1 and returns to step S43. If a disassembling motion has been created (No); at step S47, the apparatus 100 advances processing to i+1 which is next order and returns to step S43.

Then, at step S43 in FIG. 7, if it has been determined that disassembling motion creation has been completed up to the last order in the disassembling sequence (Yes), the apparatus 100 goes to step S48 and reverses the disassembling sequence and stores a result as an assembling sequence. Next, at step S49, the apparatus 100 inverts the vector sign of disassembling motion v(i) for all orders i and stores a result as assembling motion u(i).

Figure 8:
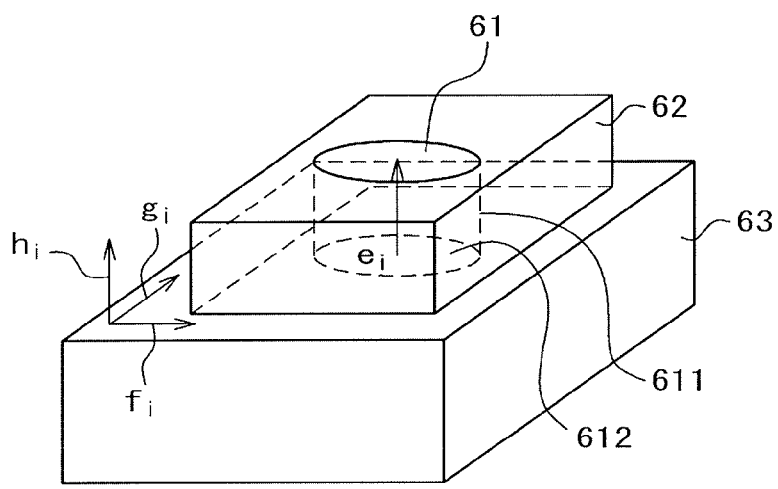
FIG. 8 is an example of a model applied to explain disassembling motion computing processing.

Computing disassembling motion at step S44 is explained with an example of a structure model depicted in FIG. 8. First, here, part p(i) for which a disassembling motion should be computed is assumed to be a. In the example of FIG. 8, reference numeral 61 denotes the part a; a part 62 abuts the part a on a cylindrical plane 611 and a part 63 abuts the part a on a planar plane 612. For a surface j that adjoins the part a, if the type of the surface j is a cylindrical plane or a conical plane, a motion vector set is computed using the central axis $e_i$ of the cylindrical plane as in Equation 1.

$$^cM_a=\{e_p-e_i\} \quad \text{[Equation 1]}$$

If the type of the surface j is a planar plane, a motion vector set is computed from a solid outward normal of the planar plane of the part 63 and an orthogonal vector on the plane as in Equation 2.

$$^pM_a=\{h_i,f_i,-f_i,g_i,-g_i\} \quad \text{[Equation 2]}$$

If there are a plurality of surfaces that adjoin the part a, a sum set of motion vector sets for each surface is taken as a motion vector set of the part a (Equation 3).

$$M_a={}^cM_a\cup{}^pM_a=\{m_1\ldots m_q\} \quad \text{[Equation 3]}$$

Here, there is a possibility that a range in which the part a of interest moves is restricted by the planar plane abutting the part and the part a interferes with the plane j adjoining it. A motion range set of the adjoining plane j is computed as in Equation 4 below.

$$D_a=\{h_i\} \quad \text{[Equation 4]}$$

To motion vectors $m_i$ that belong to a motion vector set $M_a$, restriction by element vectors $d_j$ of a motion range set $D_a$ is added.

Compensated motion vectors m are computed by Equation 5.

$$\begin{cases} F(m_{i^*}-d_j) = \begin{cases} [\overline{m}_i^{j-1}+(-d_j)]d_j & (m_i\cdot(-d_j)>0) \\ 0 & (m_i\cdot(-d_j)\leq 0) \end{cases} \\ m = \overline{m}_i^{j-1}+F(m_{i^*}-d_j) \\ \overline{m}_i^j = \dfrac{m}{\sqrt{\overline{m}\cdot m}} \end{cases} \quad \text{[Equation 5]}$$

Then, if the part interferes with a plane k ($k\neq j$) abutting it other than the plane j abutting it, the compensated motion vectors $\overline{m}_i^j$ to which the restriction of motion range of the plane j is added are not taken as disassembling motion vectors of the part a. Thus, by re-compensating the compensated motion vectors $\overline{m}_i^j$, $\overline{m}_i^j$ is computed by processing in Equation 6.

$$\begin{cases} G_k(\overline{m}_i^n) = \begin{cases} 1 & (\overline{m}_i^n\cdot(-d_k)\leq 0) \\ 0 & (\overline{m}_i^n\cdot(-d_k)>0) \end{cases} \\ \alpha_i = \prod_{k=1}^n G_k(\overline{m}_i^n) = \begin{cases} 1 \\ 0 \end{cases} \\ \hat{m}_i = \alpha_i\cdot\overline{m}_i^n \end{cases} \quad \text{[Equation 6]}$$

A disassembling vector set V(i) of the part, whose elements are re-compensated motion vectors other than 0 vector, is obtained. V(i) is expressed by Equation 7.

$$V(i)=\{\hat{m}_1\ldots\hat{m}_q|\hat{m}_k\neq 0(k=1,\ldots,q')\} \quad \text{[Equation 7]}$$

By the foregoing processing, a plurality of assembling motion vectors in which the part a does not interfere with any plane abutting it are created. By inverting their sign, an assembling motion vector set U(i) which is expressed by Equation 8 is obtained. This vector set U(i) is stored together with assembling sequence into the storage part 130 as assembling sequence data 137.

$$U(i)=\{-\hat{m}_k|\hat{m}_k\in V(i)\} \quad \text{[Equation 8]}$$

In FIG. 2, at step S50 of computing a working coordinate system; the apparatus 100 determines what posture of an assembly into which parts are assembled at a given time according to the assembling sequence created at step S40. This is referred to as a working coordinate system. In a scheme applied, with a condition of working posture that the assembly is still and stable to gravity during work, a first principal axis of inertial of the assembly is taken as a vertical axis. The principal axis of inertia and inertial tensor of each individual part model can be obtained at step S10. By integrating the inertia tensor of each of the parts constituting the assembly according to the assembling sequence, the inertia tensor of the assembly can be derived and can be transformed to the principal axis of inertia by the ratio of its opposite angles. The first principal axis of inertia has the largest inertia moment around its axis. Thus, if the first principal axis of inertia is set vertical to the horizontal plane of a workbench, the posture of the assembly becomes the most stable to gravity. However, because the principal axis of inertia does not have positive and negative signs, a direction from a barycentric position vector of the assembly toward a central position vector of the bounding box of the assembly should be set positive. By the foregoing procedure, the apparatus 100 computes a working coordinate system.

In FIG. 2, at step S60 of computing parts assembling action evaluation; for this processing, it is conceivable to apply an assemblability evaluation method which is disclosed in Japanese Unexamined Patent Application Publication No. Hei 5-114003 and others.

The assemblability evaluation method is outlined below. An assembling action that is easiest for workers to perform is set as a "reference element X0" and a basic deficiency point εx of 0 is given to this element X0. A basic deficiency point Ex is assigned to other basic elements X such that its value εx becomes larger than 0, as assembling becomes less easy than the "reference element X0", in other words, as assembling cost Cx of each basic element X becomes larger than the assembling cost Cx0 of the reference element X0 "under equal condition in terms of the number of products produced and production means, a condition such as the type of assembling equipment in use, i.e., production environment conditions", as a functional relation below:

$$\varepsilon x = f1(Cx) \quad \text{[Equation 9]}$$

Likewise, as is also exemplified in FIG. 9A, instead of the assembling cost Cx, assembling time Tx and index Ix indicating such cost and time can be assigned. That is, a relation between these parameters is expressed by the following equation.

$$\varepsilon x = f1(Cx) = f11(Tx) = f21(Ix) \quad \text{[Equation 10]}$$

Then, compensatory elements χ and a compensatory coefficient α in FIG. 9B are explained. As compensatory elements χ, material m, size 1, finishing accuracy a, etc. of a part can be assigned, though other elements can be conceived.

For each of these compensatory elements (m, l, a, etc.), its status is divided into one piece or a plurality of n pieces and compensation reference values (m0, l0, a0, etc.) for each element are defined. These values can be extracted from information (drawing data) represented in drawings or the like, products, and parts and can be specified. These items influence the easiness of assembling the part into the assembly in addition to basic elements. A compensatory coefficient α is mentioned as a compensation index indicating a degree of influence of each item. These compensatory elements (χ) are assigned a compensatory coefficient α such that, under equal production environment conditions, as assembling cost (Cx$\chi$n) in each status divided into n pieces becomes larger than the assembling cost for a compensation reference value (Cx$\chi$0 assumed to be Cx), its compensatory coefficient $\alpha$n becomes larger than 1 proportionally, as a functional relation in Equation 11 below:

$$dn=[(cxXn)/(Cx)] \times mean \qquad \text{[Equation 11]}$$

Moreover, instead of the above assembling cost Cx$\chi$n, Cx$\chi$0, assembling time Tx$\chi$n, Tx$\chi$0 and index Ix$\chi$n, indicating such cost and time can be assigned, as is the case for the above basic deficiency point $\epsilon$.

In a first column of a table in FIG. 9A, examples of basic elements X which are assembling actions classified are listed. A first example 10 is "move down and fit", a second example 11 is "move laterally and fit", and a third example 12 is "screw tightening". Description of others is omitted. These basic elements can be extracted, based on 3D CAD model information extracted at step S10, part type information determined at step S20, an assembly graph created at step S30, and assembling sequence and direction information created at step S40 and are several actions into which a parts moving and connection method or the like is classified, as in this example.

In a third column of the table in FIG. 9A, the actions of basic elements are illustrated. The number of these elements may range from several ones to several tens of ones. The larger the number of basic elements, the higher will be the accuracy of analysis and evaluation; but the apparatus will be hard to use. Conversely, the smaller the number of basic elements, the simpler will be the evaluation process; but the accuracy of evaluation will become worse.

In a fourth column of the table in FIG. 9A, examples of values of the basic deficiency point assigned to the basic elements are listed. In this embodiment, "move down" action which is easiest in an assembling operation is set as a reference basic element and a basic deficiency point of 0 is given to this element. For other basic elements, it is arranged so that their basic deficiency point $\epsilon x$ becomes larger, as assembling becomes less easy than the reference basic element, in other words, part assembling time Tx that the basic element takes, for each basic element, as is exemplified in a sixth column, becomes larger under equal condition in terms of the number of products produced and production means and a condition such as automatic or manual. Instead of assembling time, assembling cost may be used to determine a basic deficiency point $\epsilon x$.

FIG. 9B exemplifies compensatory elements. As the items of compensatory elements, part size, assembling accuracy, etc. are listed as in a table in FIG. 9B, though the table may include other various elements. These compensatory elements can be extracted from the 3D CAD model information 131 and specified (if these elements are deficient, necessary information may be given through interactive input). Items are listed that influence the easiness of assembling the part into the assembly in addition to basic elements and a degree of influence of each item is quantified, but not varying depending on the number of products produced and production means. Various methods of compensation can be applied, such as a first method that computes deficiency points of a part by multiplying a basic deficiency point Ex for each part assembling action by a compensatory coefficient $\alpha$ as described above and a second method that subtracts the sum $\Sigma$Exi of deficiency points per part from a reference score (a perfect score of 100) and multiples a result by a compensatory coefficient $\alpha$. In each case, a method should be set so that part assemblability score Ei which is finally computed will be always higher, when the part is easier to assemble into the assembly or its assembling time is shorter.

In the first method, part assemblability score Ei is expressed as below:

$$Ei=100-f11(\Sigma Exi \cdot \alpha i)$$

In the second method, part assemblability score Ei is expressed as below:

$$Ei=100-f22\{(\Sigma Exi) \cdot \alpha\} \qquad \text{[Equation 13]}$$

The resultant assemblability score Ei is an index that indicates a quality of the easiness of assembling the part into the assembly. Because the part assemblability score Ei thus obtained is computed as integration of basic deficiency points $\epsilon x$ determined in relation to assembling time Tx for each basic element, its value has a given functional relation with part assembling time T1 (Ei=f33 (Ti)).

Results of computing the evaluation of assembling actions of the respective parts are stored as evaluation result information 133 in the storage part 130.

In FIG. 2, at step S70 of creating plural worker positions, postures, and viewpoints; the apparatus 100 places a plurality of virtual cameras at even intervals around a Z axis that is upward vertically in the working coordinate system computed at step S50.

Figure 10:
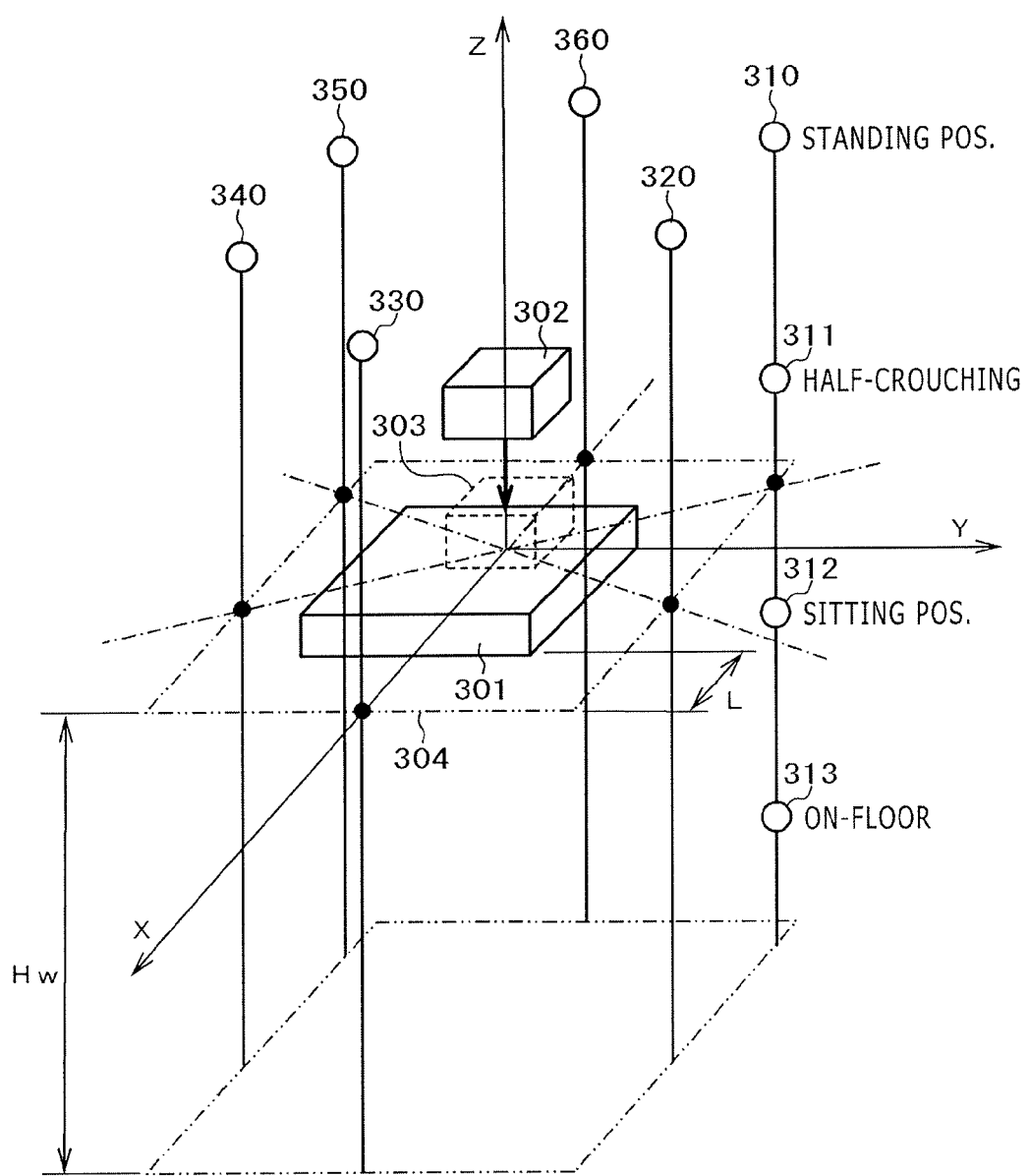
FIG. 10 is a diagram to explain a method of placing a plurality of virtual cameras to observe work of assembling parts to be assembled into an assembly in assembling sequence in order to perform ergonomics evaluations.

FIG. 10 denotes an example in which a plurality of virtual cameras are placed at even intervals, surrounding an assembly 301, around the Z axis of the working coordinate system. First, an operator sets the number N of virtual cameras (N=6 in this example), which are arranged at even intervals in a circumferential direction, through the input part 140. The operator also inputs the body height Hm of a worker and the height Hw of a workbench. The operator also sets a proportion of an arm length to the body height, a proportion of a hip height to the body height, and a proportion of a head and eye line to the body height. These settings may be absolute values not the proportions to the body.

First, the operator draws rectangular frame lines at a given distance L from the top view of the bounding box 301 for the assembly at a given time. On the rectangular frame lines, the operator places points meeting the Z-direction axes of the positions in which the N virtual cameras are placed at even intervals around the Z axis at an angle of 2$\pi$/N. It is here assumed that a worker may take a working posture such as standing position, sitting position, half-crouching position, or on-floor position. The hip and head positions change depending on the working posture of the worker. Through the input part 140, the operator sets a viewpoint (the eye position in the worker's head) for evaluation as a proportion to the body height which has been input beforehand, such as 0.9 for standing position, 0.6 for half-crouching position, 0.3 for sitting position, or 0.1 for on-floor position. Alternatively, the operator may select a viewpoint for evaluation from values which have been registered beforehand. In FIG. 10, along the vertical axis of the position of one virtual camera, the viewpoints of standing position 310, half-crouching position 311, sitting position 312, and on-floor position 313 are marked with circles. Although the above settings are proportions, the position of a virtual camera may be input with an absolute value. In the bounding box of the whole assembly, it is also supposed that a working space which is normally empty is approached externally. Therefore, a cross-sectional space with a scope (e.g., upper body dimensions) where work can be performed around a set viewpoint of a virtual camera may be set in the bounding box of the assembly, the viewpoint of the virtual camera may be made to approach to an extent that work can be performed, and computing may be executed.

In FIG. 2, at step S80 of ergonomics evaluation; the apparatus 100 performs ergonomics evaluations which will be described below for each of worker postures presumed from worker viewpoints (obtained with the virtual cameras) set at step S70. Specifically, the visibility evaluation unit 121, the working posture and eye line evaluation unit 122, the reachability evaluation unit 123, and the move line and posture change evaluation unit 124 which are included in the ergonomics evaluation unit 120 of the assembling workability evaluation computing apparatus 100 in FIG. 1 perform processing in order. Processing is described below in order.

FIG. 11 depicts an explanatory diagram of an example of visibility evaluation processing. According to an assembling sequence, the visibility evaluation unit 121 displays parts to be assembled into an assembly in a 3D model and highlights a part model that has now been assembled. In this way, the unit 121 represents a state of assembling in the 3D model and computes visibility in each of view line directions in an image captured by the set virtual cameras. As a visibility computing method, for example, the unit 121 computes the number of pixels A in a region in which a highlighted portion of an assembled part to be assembled is visible in a 2D image of a vision captured in an eye line direction of interest and the number of pixels B in a region in which only the single part to be assembled is highlighted and other parts are hidden in the 2D image of the vision captured in the eye line direction and computes a ratio between both A/B as a visibility score. To thus compute the number of pixels, the unit creates a 2D image from the 3D model in the direction of the eye line (which refers to a direction of the part to be assembled viewing the origin of the working coordinate system). Now, for computing the number of pixels A, the assembled part subjected to evaluation is only highlighted to display the assembled state. Thus, the highlighted area will be reduced by a region in which a part other than the assembled part interrupts the eye line. Computing can be easily performed on memory, such as computing highlight colored region of the assembled part in a 2D image created such that other parts are made colorless in an assembling state.

For example, FIG. 11 depicts examples of an assembled part and worker postures (viewpoints). In FIG. 11(a), the assembled part is hard to view because of an obstructive part above that part (A/B=0.7). In FIG. 11(b), the worker can view the assembled part well (A/B 1). In FIG. 11(c), the worker cannot view the assembled part (A/B=0).

Figures 12A, 12B:
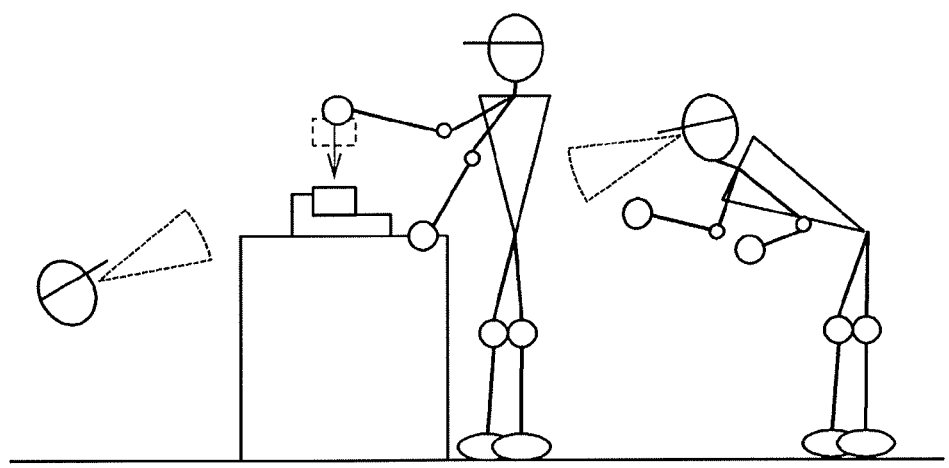
FIGS. 12A and 12B are diagrams to explain working posture and eye line evaluation processing.

FIGS. 12A and 12B depict an explanatory diagram of an example of working posture and eye line evaluation processing. From the standpoint of ergonomics, working posture and eye line (which refers to a neck posture which is determined by a working posture and a direction of eyes in this embodiment, though the same term "eye line" is used) has an influence on fatigue of working. To evaluate this working posture and eye line, the working posture and eye line evaluation unit 122 supposes a worker posture based on worker viewpoints (with the virtual cameras) created at step S70 and presumes an eye line for each of the viewpoints according to assembled part position and posture. For this processing, the unit 122 creates in advance a table in which a score of workability is set for each combination of working posture and eye line, as is exemplified in FIG. 12B, and performs evaluation for each working posture and eye line.

The area of working posture and eye line evaluation information 138 in the storage unit 130 stores in table form the scores given to possible combinations of data values assigned to the data items of part assembling direction, working posture, eye line, and score. In the table in FIG. 12B, an example of evaluation using discrete information pieces such as "standing position", "half-crouching", and "obliquely up" is presented; however, a score calculation formula with parameters of hip, viewpoint, and eye line may be provided.

Figure 13:
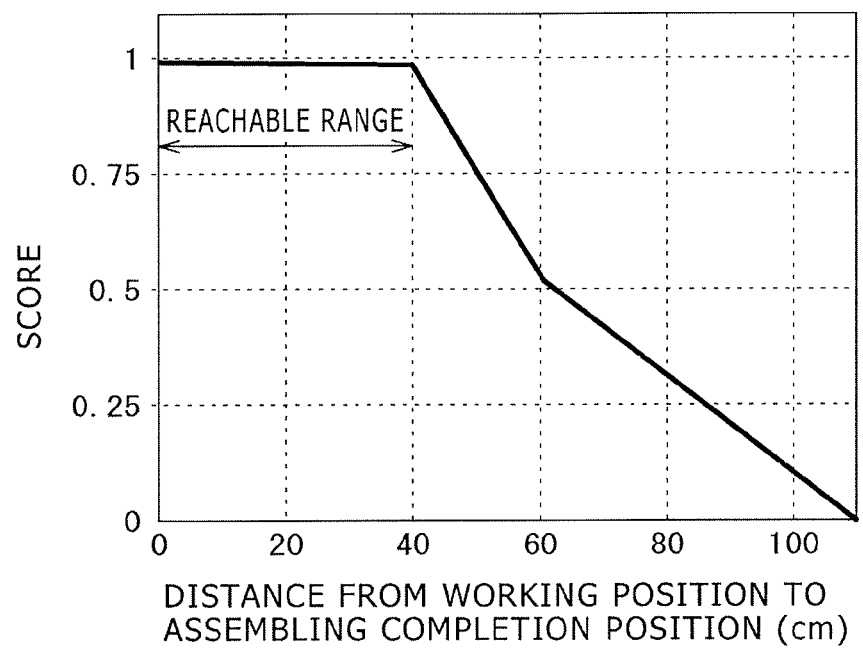
FIG. 13 is a diagram presenting an example of a function value which is referred to in reachability evaluation processing.

FIG. 13 presents an example of a function value which is referred to in reachability evaluation processing. The length of the arms of a work is finite and, in some situations, a worker cannot access a part to be assembled, when the worker is in a standing position presumed from the viewpoint positions obtained with the virtual cameras, described with FIG. 10. Therefore, the reachability evaluation unit 123 computes a distance from a worker's standing position and the coordinates of the position of a part to be assembled and evaluates whether or not the worker can easily reach the part (reachability). Here, for example, as is exemplified in FIG. 13, an easily reachable range (e.g., 40 cm or less) is given a reachability score of 1 and an evaluation function is defined for a range in which the worker can reach the part by extending his or her arm and a distance at which the worker cannot reach the part.

A reachability evaluation function 139 is pre-registered in the storage part 130 and the unit 123 computes reachability to a part to be assembled by referring to this function.

Figure 14:
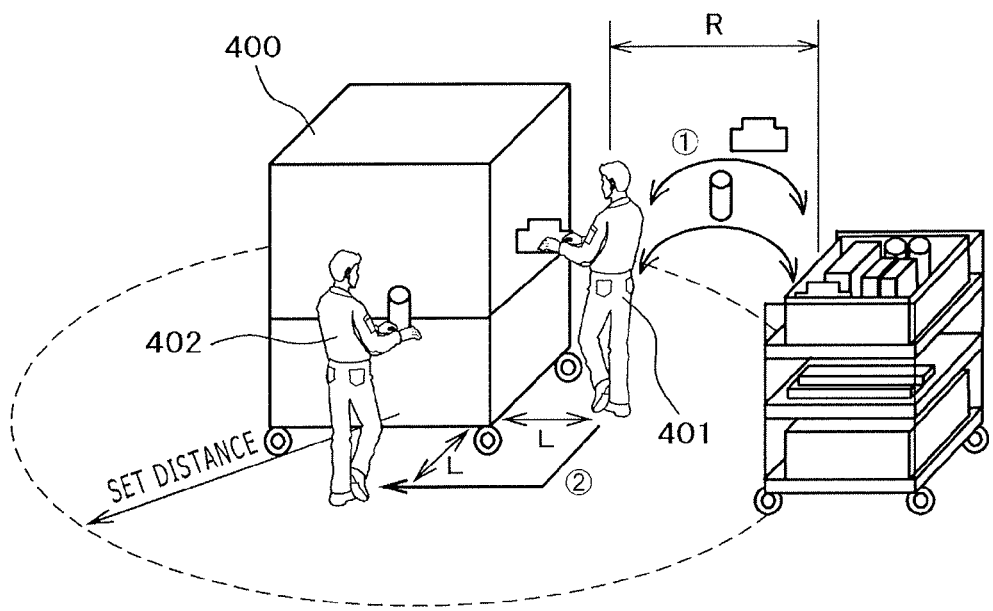
FIG. 14 is a diagram to explain move line and posture change evaluation processing.

FIG. 14 depicts an explanatory diagram of move line and posture change evaluation. Each of the above-mentioned ergonomics evaluation units observes a worker who assembles one part into an assembly and performs an evaluation. Here, if visibility, reachability, etc. regarding the work of assembling one part are good, but the worker makes quite a waste motion when moving to next work after finishing assembling that part, overall workability may deteriorate. Therefore, the move line and posture change evaluation unit 124 evaluates an amount of movement of a worker moving to a next action and working posture change after assembling a part. In FIG. 14, a parts organizer carriage is assumed to be present at a preset distance R. Relative to the top view of the bounding box 400 of an assembly according to an assembling sequence, the unit 124 derives the length of a concatenated line along outer periphery lines at a distance L (L is assumed to be, e.g., 20 cm) from the outlines of the top view of the bounding box 400 as a move line to a next assembling work position from a working posture 401 presumed from the viewpoint positions obtained with the virtual cameras to a working posture 402 presumed from the viewpoint positions obtained with the virtual cameras for assembling a next part into the assembly. To evaluate working posture change, the unit 124 computes a vector in which the worker approaches a part to be assembled from an assembling position of a part to be assembled and the worker's standing position computed from the viewpoint positions of the virtual cameras and computes an angle change between the above vector and a vector computed when the worker performs a next assembling action. By this move line and posture change evaluation, a waste motion of the worker can be perceived.

In FIG. 2, at step 90 of overall assembly workability evaluation; the overall assembling workability evaluation unit 118 computes a total evaluation value by multiplying each of the evaluation values of (1) evaluation of parts assembling actions, (2) visibility evaluation, (3) working posture and eye line evaluation, (4) reachability evaluation, and (5) move line and posture change evaluation, described previously, by a weight coefficient and adding results. Note, however, that ergonomics evaluations ((2) thru (5)) are performed by setting a plurality of virtual cameras for each assembling action at a given time according to an assembling sequence and with regard to a plurality of working postures (in the example of FIG. 10, the number of virtual cameras N arranged at even intervals in a circumferential direction x the number of working posture patterns of a worker). In processing of these evaluations, for ergonomics evaluations (2) thru (4), working postures are narrowed down to only those having higher total scores of assembling work evaluation. For example, an operator sets in advance a score threshold value or a number of candidates from top which should be selected. For working posture candidates thus narrowed down, the apparatus creates all combinations according to an assembling sequence, performs an evaluation (5) with regard to moving of working posture, and determines an optimal solution as an ergonomics evaluation. Again in this case, the apparatus may determine a plurality of candidates from top, rather than determining one solution.

Meanwhile, the apparatus may derive a plurality of assembly sequence plans. According to each of these plans, the apparatus performs all processing operations described previously. The above unit 118 multiples the evaluation values thus computed for the ergonomics evaluations ((2) thru (5)) and the evaluation of parts assembling actions (1) by a weight coefficient and adds results, thereby computing a total evaluation result value. The total evaluation result is stored as evaluation result information 133 in the storage part 130.

Figure 15:
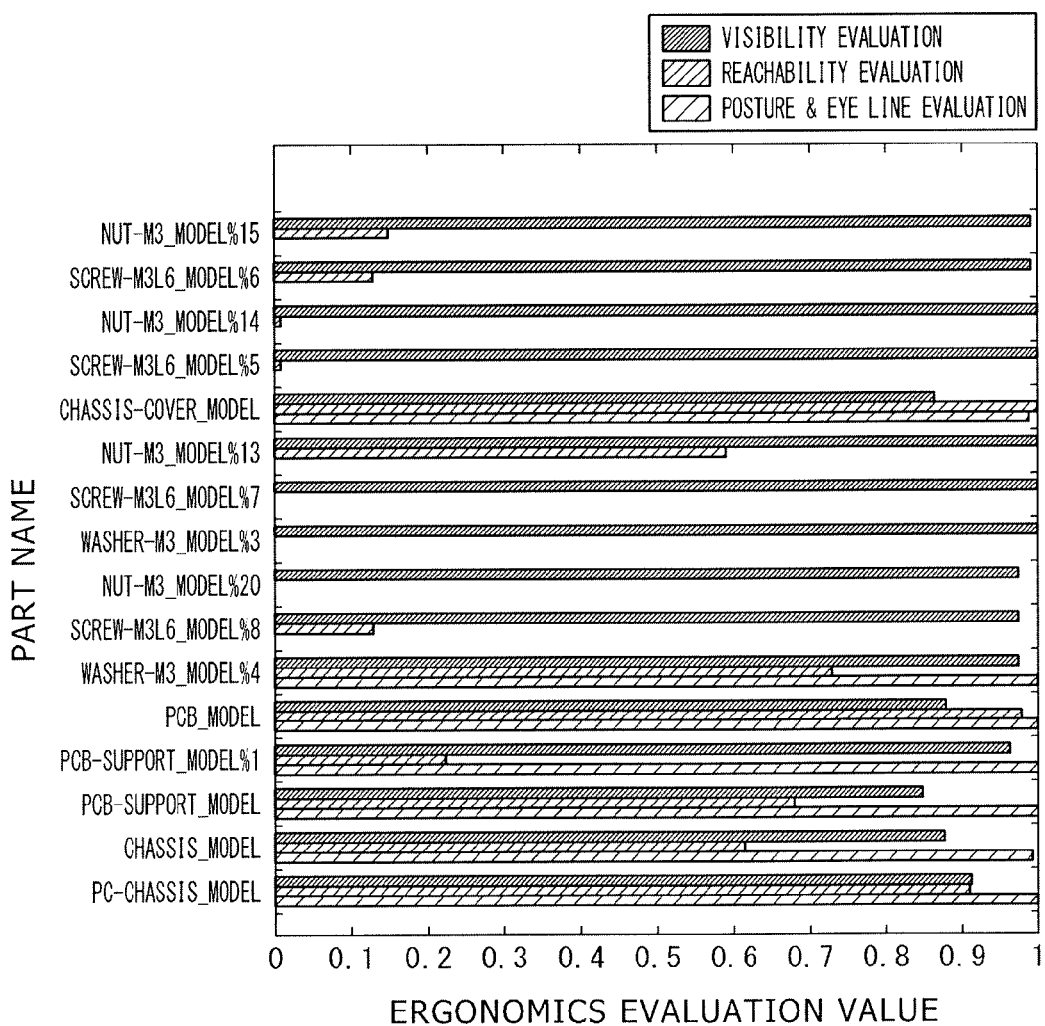
FIG. 15 is a diagram presenting an example of an output of computing results for each evaluation in ergonomics evaluation processing.
Figure 16:
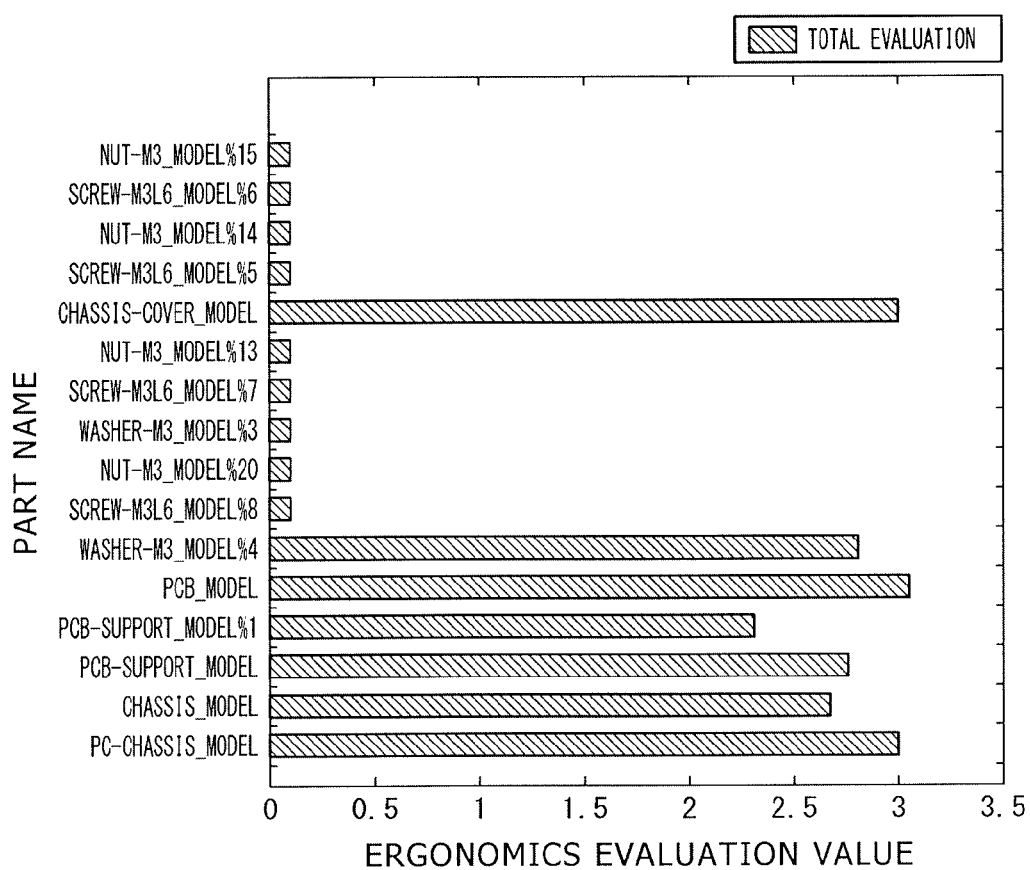
FIG. 16 is a diagram presenting an example of an output of overall evaluation computing results in ergonomics evaluation processing.
Figure 17:
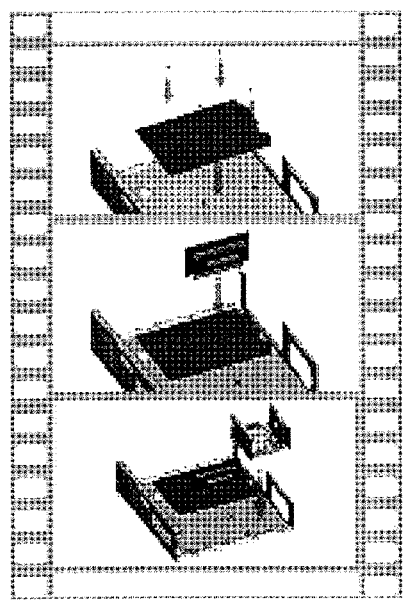
FIG. 17 is a diagram presenting an example of animation of assembling actions created from a worker viewpoint determined as an optimal solution.

As results, the following are output; evaluation computing results on a per-part basis (FIG. 15), total evaluation computing results (FIG. 16), and an animation of assembling actions created from a worker viewpoint determined as an optimal solution as work instructions views (FIG. 17).

The present invention is not limited to the described embodiment and various modifications are included therein. For example, the foregoing embodiment is described in detail to explain the present invention clearly and the invention is not necessarily limited to the embodiment including all components described. A subset of the components of an embodiment can be replaced by components of another embodiment. To the components of an embodiment, components of another embodiment can be added. For a subset of the components of each embodiment, other components can be added to the subset or the subset can be removed and replaced by other components.

A part or all of the foregoing components, functions, processors, processing units, etc. may be implemented by hardware such as designing them with integrated circuits. The above components, functions, and the like may be implemented by software in such a way that a processor interprets a program that implements each function and executes it. Information such as programs, tables, and files for implementing the respective functions can be stored on a recording device such as a memory, hard disk, and SSD (Solid State Drive) or a recording medium such as an IC card, SD card, and DVD.

REFERENCE SIGNS LIST

61 . . . the part a
62,63 . . . a part
100 . . . Assembling workability evaluation computing apparatus
110 . . . Control part
111 . . . 3D CAD model information obtaining unit
112 . . . Parts sorting and distinctive shape detecting unit
113 . . . Assembly graph creating unit
114 . . . Assembling sequence, directions, and actions creating unit
115 . . . Working coordinate system computing unit
116 . . . Parts assembling action evaluation computing unit
117 . . . Plural worker positions, postures, and viewpoints setting unit
118 . . . Overall assembling workability evaluation unit
120 . . . Ergonomics evaluation unit
121 . . . Visibility evaluation unit
122 . . . Working posture and eye line evaluation unit
123 . . . Reachability evaluation unit
124 . . . Move line and posture change evaluation unit
130 . . . Storage part
131 . . . 33 CAD model information
132 . . . Part type information
133 . . . Evaluation result information
134 . . . Evaluation computing programs and computing conditions
135 . . . Assemblability basic and compensatory elements data
136 . . . Assembly graph
137 . . . Assembling sequence data
138 . . . Working posture and eye line evaluation information
139 . . . Reachability evaluation function
140 . . . Input part
150 . . . Display part
160 . . . Communication part
200 . . . 3D CAD device
210 . . . Network
301 . . . Assembly
310 . . . Viewpoint of standing position
311 . . . Viewpoint of half-crouching position
312 . . . Viewpoint of sitting position
313 . . . Viewpoint on-floor position
400 . . . Bounding box of an assembly
401 . . . Working posture presumed from the viewpoint positions obtained with the virtual cameras
402 . . . Working posture presumed from the viewpoint positions obtained with the virtual cameras for assembling a next part into the assembly
611 . . . Cylindrical plane
612 . . . Planar plane

What is claimed is:

1. An assembling workability evaluation computing apparatus that evaluates assemblability and workability of assembling work which sequentially assembles a plurality of parts constituting an assembly, the assembling workability evaluation computing apparatus comprising:
a processor which further comprises
an information obtaining portion configured to extract from an external 3D Computer Aided Design (CAD) device information comprising a plurality of attributes of each of a plurality of parts, locations of the parts, and adjoining relations with other parts from a 3D CAD model; and
a parts sorting and distinctive shape detecting portion configured to sort parts by part type from the obtained 3D CAD model information,
wherein the processor is further configured to
represent relations between parts using an assembly graph in which nodes denote parts and edges denote adjoining relations from information relevant to adjoining relations between parts in the 3D CAD model information;
create disassemblable directions, based on the assembly graph, creates disassembling directions and a disassembling sequence, and, by reversing the disassembling sequence and directions, derive an assembling sequence and assembling directions;

compute deficiency points of a part by multiplying a basic deficiency point Ex for each part assembling action by a compensatory coefficient a, and compute an index indicating a quality of easiness of assembling a part into an assembly by subtracting the sum of deficiency points per part from a reference score;

create a plurality of virtual worker positions, postures, and viewpoints according to an assembling sequence using a plurality of virtual cameras arranged at even intervals surrounding said assembly in a circumferential direction such that said plurality of virtual worker positions, postures, and viewpoints are created according to a coordinate system;

evaluate workability in the created worker positions, postures, and viewpoints; and compute an evaluation value per part by the index of easiness of assembling the part and a total evaluation value of assembly workability and outputs results.

2. The assembling workability evaluation computing apparatus according to claim 1, wherein the processor is further configured to evaluate workability in the combinations of a plurality of virtual worker positions, postures, and viewpoints which have been set by performing at least one of the following:

evaluating an easiness of viewing a part being assembled viewed from a viewpoint;

evaluating a degree of fatigue of a worker from the worker posture and eye line direction;

evaluating a distance to a part being assembled; and evaluating a distance to move to a next action and a worker posture change.

3. The assembling workability evaluation computing apparatus according to claim 2, wherein, in a virtual worker position, posture, and viewpoint which have been set, the processor computes a score from comparison between an image region in which a part being assembled is visible when assembling the part according to an assembling sequence and an image region in which only the single part to be assumed is apparent with other parts hidden, both images being viewed from the same position and direction.

4. The assembling workability evaluation computing apparatus according to claim 2, wherein the processor registers in advance a relational table or relational expression regarding working postures and eye lines and distance to a part in a storage part and compute a score, based on the relational table or relational expression.

5. The assembling workability evaluation computing apparatus according to claim 2, wherein the processor computes the length of a route along an outer periphery line at a given distance relative to a bounding box of a 3D CAD model of an assembly as a move line to a next assembling work position to evaluate a worker position and posture which change according to an assembling sequence and computes an angle change between vectors from working position to part to be assembled to evaluate posture change.

6. The assembling workability evaluation computing apparatus according to claim 1, wherein the processor is further configured to create an animation of assembling actions based on actions of assembling a plurality of parts after deriving the assembling sequence and assembling directions and a worker position, posture, and viewpoint selection from previous processing of computing an evaluation value per part by the index of easiness of assembling the part and a total evaluation value of assembly workability.

7. An assembling workability evaluation method for evaluating assemblability and workability of assembling work which sequentially assembles a plurality of parts constituting an assembly, the assembling workability evaluation method comprising the steps of:

extracting information on attributes of each of a plurality of parts, locations of the parts, and adjoining relations with other parts from a 3D CAD model obtained from CAD;

sorting parts by part type and detecting a distinctive shape from obtained 3D CAD model information;

representing relations between parts in an assembly graph in which nodes denote parts and edges denote adjoining relations from information relevant to adjoining relations between parts in 3D CAD model information;

creating disassemblable directions, based on the assembly graph, creating disassembling directions and a disassembling sequence, and deriving an assembling sequence and assembling directions by reversing the disassembling sequence and directions;

computing deficiency points of a part by multiplying a basic deficiency point Ex for each part assembling action by a compensatory coefficient a and computing an index indicating a quality of easiness of assembling a part into an assembly by subtracting the sum of deficiency points per part from a reference score;

creating a plurality of virtual worker positions, postures, and viewpoints according to an assembling sequence using a plurality cameras arranged at even intervals surrounding said assembly in a circumferential direction such that said plurality of virtual worker positions, postures, and viewpoints are created according to a coordinate system;

evaluating workability in the created worker positions, postures, and viewpoints; and computing an evaluation value per part by the index of easiness of assembling a part and a total evaluation value of assembly workability and outputs results.

8. The assembling workability evaluation method according to claim 7, wherein the step of evaluating workability in the combinations of a plurality of virtual worker positions, postures, and viewpoints which have been set comprises at least one of the following:

a visibility evaluation step that evaluates easiness of viewing a part being assembled viewed from a viewpoint;

a working posture and eye line evaluation step that evaluates a degree of fatigue of a worker from the worker posture and eye line direction;

a reachability evaluation step that evaluates a distance to a part being assembled; and a move line and posture change evaluation step that evaluates a distance to move to a next action and a worker posture change.

* * * * *